UNITED STATES PATENT OFFICE 2,558,769

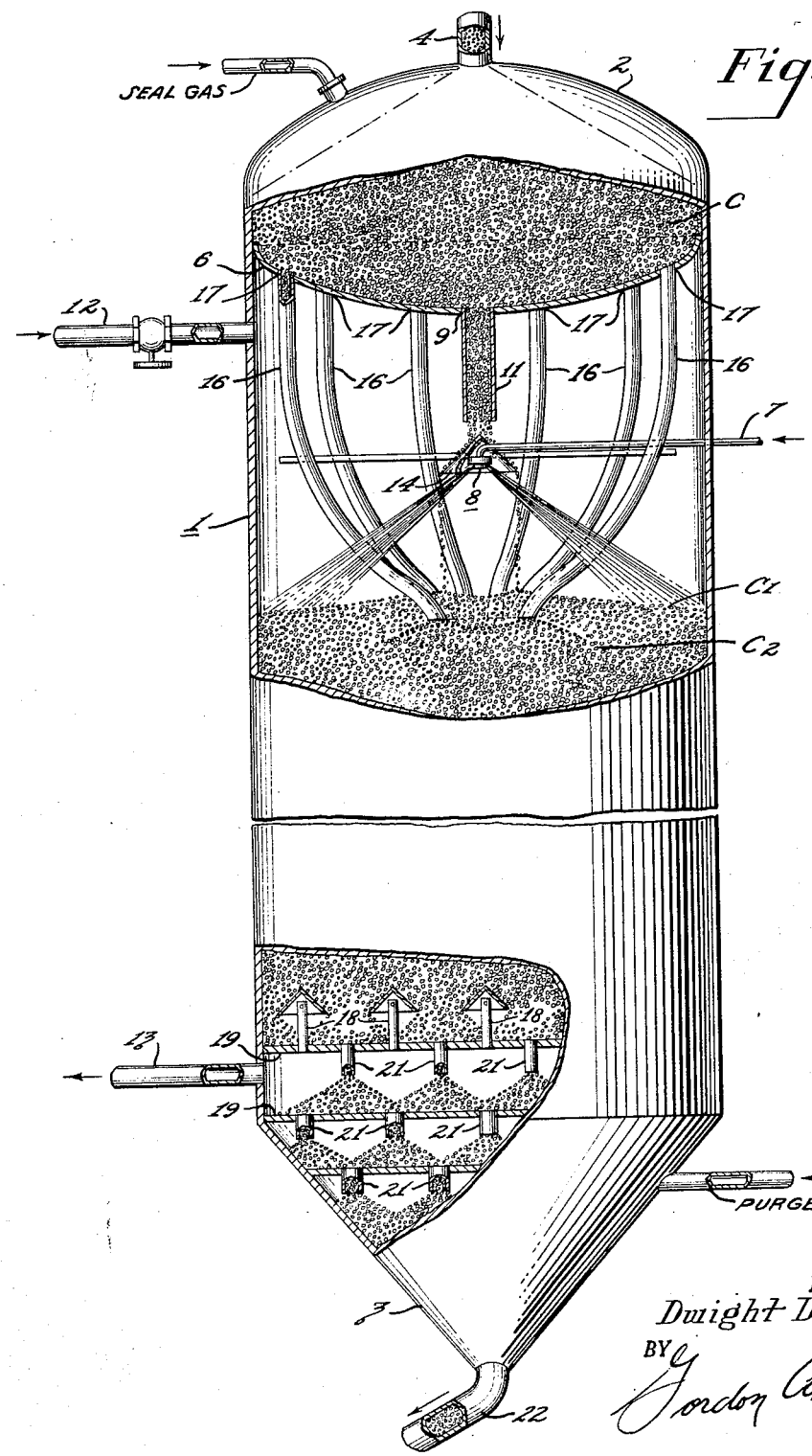

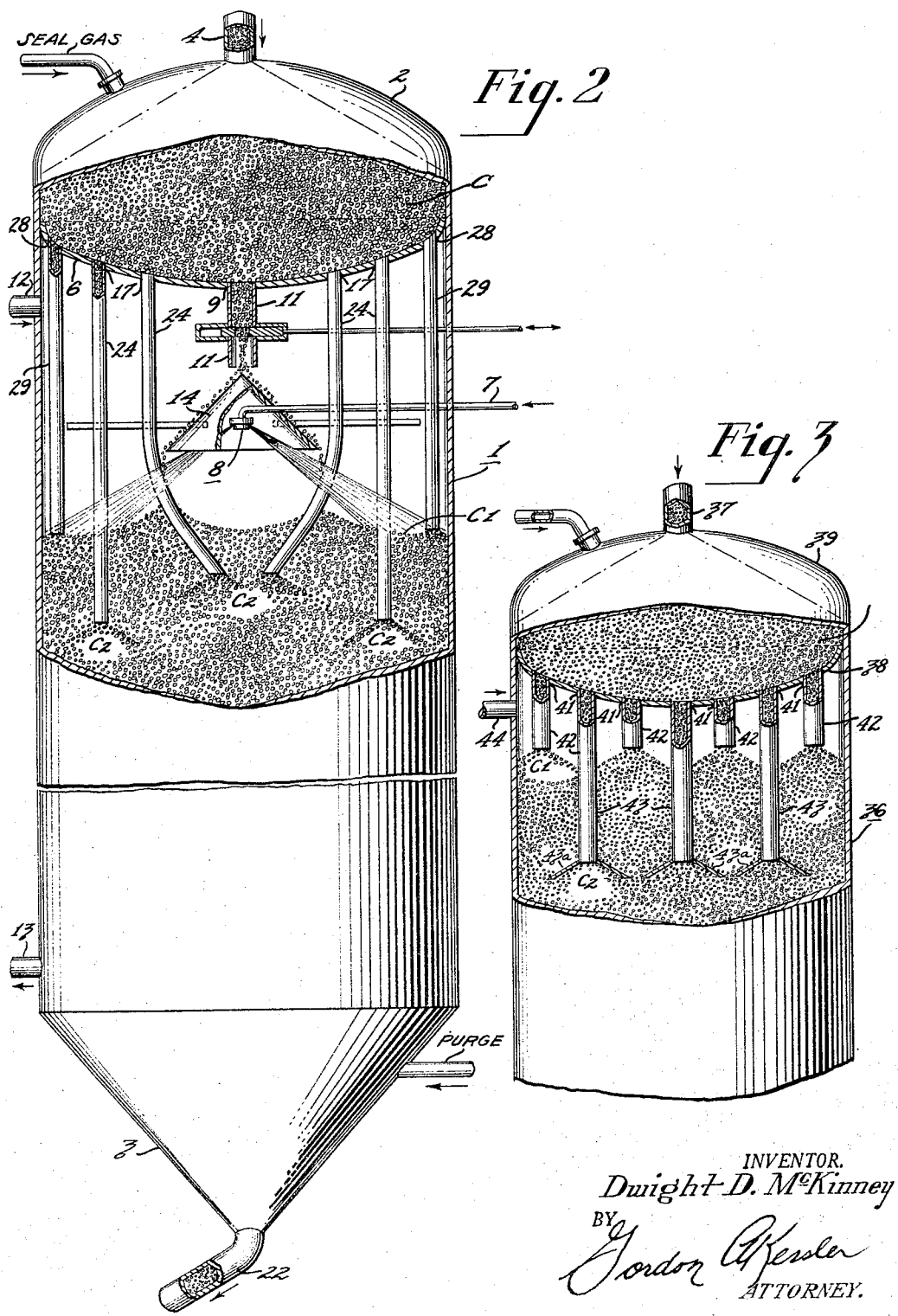

PROCESS FOR CONTROL OF HYDROCARBON REACTIONS IN MOVING SOLIDS CONTACTING SYSTEMS

Dwight D. McKinney, Drexel Hill, Pa., assignor to Houdry Process Corporation, Wilmington, Del., a corporation of Delaware Application January 2, 1948, Serial No. 288

5 Claims. (Cl. 196—52)

This invention relates to improvements in processes wherein petroleum stocks and other hydrocarbons particularly high boiling hydrocarbon materials are contacted with solid contact materials in moving bed systems.

A particularly successful process in commercial use for the conversion of hydrocarbons, especially catalytic cracking, is characterized in that the hydrocarbons to be converted, which may be in liquid, vapor or mixed phase, are contacted with a solid contact material in particulate form, especially in the form of small pellets or beads, which is moving, as a non-turbulent bed, gravitationally downwardly through the reactor. The reactors are provided with distributing means which effect substantially even distribution of the entering stream of the catalyst across the reactor to provide the upper surface of a catalyst bed. Charge is admitted to the reactor to be applied to the bed in desired manner at the top or bottom of the bed. Catalyst and cracked products issue separately from the reactor, whence the catalyst passes continuously through a suitable regenerator wherein carbonaceous deposit resulting from the conversion reaction is burned off with air or other oxygen-containing gas and the temperature of the catalyst is raised.

The present invention is concerned with improvements in processes of this type. In accordance with the invention the catalyst flowing into the reactor is in part introduced below the surface of the catalyst bed in the moving bed reactor. By proceeding in this way, more exact and flexible control over temperature and heat content of the catalyst bed is made possible. For example, the temperature differential across the length of the bed is reduced, thus assuring a substantial reaction rate throughout the bed, whether the charge be in liquid, vapor or mixed phase. Moreover, by this process the hydrocarbons or at least a portion of them are contacted with catalyst at different stages of catalytic deactivation, which may be due to the effect of the deposition of coke or the action of impurities in the charge, whereby the higher conversion properties of the less deactivated catalyst are advantageously employed. Other advantages of the invention will be apparent as the description proceeds.

The invention is especially valuable when applied to the processing of heavy oils such as crude bottoms, distillation residues, and the like which are difficult, if not impossible, to vaporize by the usual methods without concomitant production of coke and lower boiling thermally cracked products including gasoline in substantial quantity. Therefore the detailed description will largely be concerned with methods of treating such oils. The invention has particular application to the catalytic cracking of such stocks when admitted to the catalyst at least partly in liquid phase.

In accordance with a preferred embodiment, the invention involves introducing a plurality of streams of clean catalyst at cracking temperature within the reaction zone. Heavy cracking stock at least partly in the liquid phase and at temperatures below cracking level is contacted with one of said streams before said stream reaches the main body of the catalyst within the reaction zone. Simultaneously at least one and preferably a plurality of streams of the hot clean catalyst are separately introduced into the reaction zone and are added to or commingled with the aforesaid first stream but below the surface of the bed of catalyst.

In practice of this embodiment of the invention, vaporization and cracking of the charge are initiated within the portion of catalyst to which it is introduced. Thereafter, further heating and cracking of any remaining liquid components of the charge, as well as of vaporized and any vapor phase components thereof, are effected in the main body of catalyst containing the additional stream or streams of hot active catalyst which is free or relatively so of coke, tar, or other deposit resulting from contact vaporization and conversion of the heavy oil.

Reference should be made to the accompanying drawings for a more complete description of the invention including preferred aspects and embodiments thereof.

In the drawings:

Fig. 1 is a vertical sectional view partly in elevation showing a reaction zone housing with associated elements in accordance with one embodiment of the invention;

Fig. 2 is a sectional view of a portion of a reaction zone housing in which another embodiment of the invention may be practiced; and, Fig. 3 is a vertical sectional view partly in elevation showing another embodiment of this invention.

With reference to Fig. 1, there is shown a reactor 1 in which a catalytic cracking reaction is carried out. The reactor is provided with top 2 and a conical bottom portion 3. Fresh catalyst, for example from 900°–1000° F., enters the reactor at desired rate through line 4 and establishes a reservoir of fresh hot catalyst within the chamber defined by plate 6 and top 2 of the reactor. Liquid feed of the type referred to, below cracking temperature, enters through line 7. This liquid feed is distributed to a controlled portion of the contact mass through the distributor 8 which is shown as a nozzle but which may be any other suitable spray or atomizing device which effects relatively uniform distribution of the atomized liquid directly to the surface of the main reactor bed or to a portion of fresh catalyst as it moves past the distributor, or which effects some appropriate distribution of the atomized liquid on the catalyst moving through or past the zone of spray and the catalyst comprising the surface of the main reaction bed. A stream of fresh catalyst C is admitted through a suitable opening 9 in plate 6 leading to pipe 11. The vapor portion of the charge, if any, may be introduced to the system with the liquid feed through line 7, thus creating a mixed phase discharge through distributor 8, or it may be admitted separately through line 12 or may be suitably divided in such fashion that some of the vapor charge may be admitted through line 7 and line 12. Products are removed through line 13.

Fresh catalyst C after passing through opening 9 and pipe 11 and over distributing cone 14 is contacted with the atomized liquid oil charge from distributor 8 and thereafter continues to the surface of the main reaction bed to assume the position roughly shown as C1. Thereafter, the catalyst moves downwardly through the reactor. In order to introduce a portion of the hot catalyst C below the surface C1 of the catalyst bed, there is provided a plurality of pipes 16 leading from openings 17 in plate 6. By this means fresh catalyst is transported from the upper fresh catalyst reservoir to a region below the surface C1 of the main bed of catalyst in such fashion that fresh catalyst not previously contacted with either liquid or vapor charge is admitted interiorly to the main bed of catalyst. This fresh catalyst after emerging from the pipes gravitates downwardly as a more or less unitary mass designated as C2.

With the usual type of vapor catalyst disengaging system channel members 18 provide for the separation of the products from the spent catalyst which thereafter passes through opening in tube sheets 19 and collector pipes 21 with final discharge, at temperatures which may be as much as 100° F. below the inlet temperatures, from the system through line 22. The spent catalyst then passes through suitable reactivation treatment (not shown) whereby the inactivating carbonaceous deposit is removed by oxidation and an appreciable amount of the heat from the exothermic oxidative reaction is stored in the reactivated catalyst. This reactivated catalyst with its available heat is then returned to the reactor for reuse as hereinafter described.

When the operation is primarily one of cracking of heavy petroleum stocks, such charge stocks that boil predominantly or even substantially completely above about 800° F. may be heated prior to admission to the cracking system to a suitable temperature such as about 400–800° F. or higher, as for example to about 700° F. Any suitable catalytic contact mass such as activated clay catalysts, synthetic catalysts, mixtures of clay and synthetic catalysts, or mixtures of active catalysts and relatively inert heat capacity material having generally large dimensions such as between $\frac{1}{16}$ and $\frac{3}{4}$ of an inch may be utilized, in the reactor, comprising the contact mass C1 and C2. Examples of suitable cracking catalysts include naturally active or activated clays or earths such as kaolins and montmorillonites; and synthetic plural oxide composites either siliceous or non-siliceous in character and containing for example alumina, berryllia, zirconia or the like. These materials may be in the form of pellets, granules, chunks, beads or the like and having the above mentioned dimensions.

Petroleum charge stock having suitable temperature, as in the range of 400–800° F., being in a suitable state of vapor and liquid phase such as in a phase condition having approximately 70–90% more or less in the vapor phase and the remainder in the liquid phase, may be supplied continuously through line 7 at superatmospheric pressure ranging for example from 10–200 lbs. per square inch gage or otherwise as may be required for charging the atomized hydrocarbon mixture to its intended destination. This hydrocarbon material after passage through line 7 is then distributed through distributor 8 with relatively uniform distribution of the desired type to the upper region of the catalyst bed. The vaporized material may be comprised solely of vaporized material from such heavy charge stocks as hereinbefore designated or may be comprised either entirely or partially of suitable extraneous cracking stock material, such as for example, light or heavy gas oils either as fresh or recycle feed. Steam or other desirable gaseous material such as hydrocarbon gases or vapors may be employed advantageously and in known manner in the preparation, delivery and distribution of the hydrocarbon charge.

As hereinbefore stated, the oil-contacted catalytic material having reached the surface of the main catalyst bed then proceeds downwardly through housing 1. As this gravitational movement proceeds, it is desirable that any liquid deposited on the catalyst be vaporized by the heat in the bed of catalyst. This heat, however, in many cases is not sufficient to effect such vaporization either because of inequalities of distribution, or deposition of excessive amounts of oil in relation to the heat capacity of the catalyst, or other reasons including the generally endothermic nature of the vaporization and of the cracking reaction. As a result catalyst, or localized portions thereof, decreases in temperature sometimes even to levers of low cracking and vaporizing efficiency. This invention is especially advantageous because of the addition to the system of additional amounts of hot fresh catalyst which have not been exposed to the liquid feed. The additional heat is transferred from this hot clean catalyst to the bed at portions of the latter requiring additional heat, either by direct contact of hot catalyst with the relatively cool catalyst or through the agency of the vapors circulating through the catalyst bed.

Another advantage is inherent when at least an appreciable portion of the hot fresh catalyst is introduced into the main catalyst bed and closely adjacent to the surface thereof when such introduction is more or less directly under the liquid feed inlet member. Under normal operating conditions, the liquid feed is introduced under such conditions that relatively uniform distribution of the liquid feed within the catalyst may be expected but abnormal conditions may arise whereby the liquid flow is affected, resulting in liquid dripping or running directly and in an undispersed condition to the surface of the catalyst bed where, without benefit of this invention it would form concentrations of coke and unprocessed oil. In provision of the constantly renewing hot clean catalyst in accordance with the invention losses of cracking efficiency that would otherwise result from such concentrations, when they occur, are minimized or even eliminated.

The amount of catalyst which is introduced to the system either for direct contact with the liquid oil or as the fresh catalyst for admission below the surface of the bed may vary considerably in respect to type of charge stock or operational requirements. For instance, it may be desirable to admit a major portion such as 80% or more of the catalyst for direct contact with the hydrocarbon charge stock or it may be desirable to admit the major portion of the catalyst such as up to 80% below the surface of the bed. Under certain conditions it may be desirable to admit equal portions of the catalyst through both types of admission systems.

Considerable variations of form, type, volume and discharge positions of the transfer passage forming members through which the hot fresh catalyst is introduced into the catalyst bed are possible. For instance, it may be desirable to have one or more of these members discharging fresh catalyst centrally below the surface of the catalyst bed as indicated hereinbefore while other members at the same time and under similar conditions are discharging fresh catalyst below the surface of the bed to the peripherial regions thereof. It is likewise possible to extend the discharge points of the members to any reasonable extent throughout the length of the bed, such as ranging from a discharge point directly below the surface of the bed to a point or points half-way or more downwardly within the catalyst bed.

For a diagrammatic representation of another embodiment of apparatus in which this invention may be practiced, reference is made to Fig. 2 in which, under the same numerical designations of most of the elements shown in Fig. 1, a section of a reactor is shown in which the configuration of the transfer passage forming pipes 24 results in discharge of the hot fresh catalyst within the bed at different levels and positions. As shown, the catalyst admitted below the surface of the catalyst bed through pipes 24 is distributed in part centrally to form a core of hot catalyst substantially directly under the liquid distributor nozzle 8, and in part is distributed at points more or less directly under the catalyst added to and forming the top surface of the bed to further aid in the distribution of catalyst within the reaction bed. In addition to the varying lateral points of discharge their vertical relation is varied to increase the effect of the added contact material with its available heat and appreciable activity. An additional portion is admitted through openings 28 and lines 29 to establish and maintain the bed level and upper surface.

Reference to Fig. 3 shows an embodiment of this invention in a reactor to which the hydrocarbon charge is admitted substantially completely in the vapor phase. In this figure hot fresh catalyst is admitted to the reactor 36 through pipe 37 and forms a reservoir of hot fresh catalyst C within the chamber defined by plate 38 and top 39 of the reactor. A controlled portion such as 30 to 90% of the hot fresh catalyst C passes through certain of the openings 41 and thence through pipes 42 to form the top section of the reaction bed C1. Another controlled portion such as 70 to 10% of the hot fresh catalyst C passes through others of openings 41 and thence through pipes 43 and discharges interiorly within the catalyst bed as C2. Throttling cones 43a or similarly functioning devices or means are positioned at the approximate upper level of the contact mass portion shown as C2 in order that the rate of flow of the contact mass portion C1 may be controlled to the desired extent by regulation of the cross-sectional area of the openings between cones 43a to substantially the same area as the discharge openings of pipes 42. The hydrocarbon feed vapor at temperatures, for example, of 750° to 950° F. is introduced through line 44 and contacts and is partially converted in the presence of catalyst C1 which is at least partially deactivated by the deposition thereon of carbonaceous residue from the conversion reaction and/or components other than hydrocarbons which may be present in the charge stock; thereafter the partially converted material in passage through the reaction zone, is contacted with the hot fresh catalyst portion or portions C2 and is further converted with the assistance of the additional heat and catalyst of the portion or portions C2. It is obvious that the advantages will accrue in reaction systems to which the hydrocarbon charge is admitted as vapor whether the direction of vapor flow is as set forth in Fig. 3 or is admitted to flow in countercurrent relation with the movement of the catalyst bed.

The foregoing examples are not to be construed as the only means of practicing this invention since many modifications and variations can be practiced without departing from the spirit and scope thereof. Therefore, only such limitations as set forth in the appended claims should be considered.

I claim:

1. In a process for the conversion of heavy petroleum stocks which are charged to a reaction zone in at least partially liquid phase, and wherein such conversion is effected in the presence of a bed of gravitationally moving contact material, the improvement comprising introducing from a supply zone a first portion of clean contact material at conversion conditions to a reaction zone to form the upper surface of a gravitationally descending bed of such contact material in said reaction zone, supplying heavy petroleum stock to the upper surface of said bed by dispersing said stock as a spray onto descending contact material from a liquid distributing source above said bed, and introducing a second portion of the clean contact material from said supply zone at hydrocarbon conversion conditions into said descending bed directly at a level below the upper surface of the bed and in a transversely limited area directly beneath the liquid distributing source, thereby minimizing local concentrations of coke and unprocessed oil from liquid dripping in undispersed state upon the bed of contact material from said liquid distributing source under possible abnormal conditions.

2. The process of claim 1 wherein at least part of the heavy petroleum stock sprayed onto said first portion of contact material is directed to engage such material prior to the formation of the upper surface of the bed by such contact material.

3. The process of claim 1 wherein the conversion conditions are cracking conditions and the contact material is cracking catalyst.

4. The process of claim 1 wherein the conversion conditions are vaporizing conditions and the contact material is substantially inert and of high heat capacity.

5. The process of claim 1 wherein the conversion conditions are cracking conditions and the contact material is a mixture of cracking catalyst and relatively inert high heat capacity material.

DWIGHT D. McKINNEY.

REFERENCES CITED

The following references are of record in the file of this patent:

UNITED STATES PATENTS

| Number | Name | Date |
|---|---|---|
| 2,416,214 | Payne | Feb. 18, 1947 |
| 2,429,161 | Hudson | Oct. 14, 1947 |
| 2,441,170 | Rose et al. | May 11, 1948 |
| 2,490,336 | Crowley | Dec. 6, 1949 |

OTHER REFERENCES

Commercial T. C. C. Operations on Partially Vaporized Charge Stocks, by Noll et al., Houdry Pioneer, vol. 2, No. 1, October, 1946 (Fig. 1, page 1).